Jan. 24, 1939.  T. L. DIMOND  2,145,042
TIMING DEVICE
Filed July 10, 1937

INVENTOR
T. L. DIMOND
BY
ATTORNEY

Patented Jan. 24, 1939

2,145,042

UNITED STATES PATENT OFFICE 2,145,042

TIMING DEVICE

Thomas L. Dimond, Rutherford, N. J., assignor to Bell Telephone Laboratories, Incorporated, New York, N. Y., a corporation of New York Application July 10, 1937, Serial No. 153,067

17 Claims. (Cl. 175—183)

This invention relates to timing devices and particularly to electrical circuits for measuring and checking the duration of short intervals of time.

The objects of the invention are to facilitate the measurement of short intervals of time, to provide an inexpensive, simple, and reliable device for determining and indicating whether an interval of time falls within certain predetermined limits, and to otherwise improve timing and testing devices.

According to this invention a timing device, adapted to test the interval during which electrical contacts are open, comprises a condenser connected across the anode and cathode of a three-element gas-filled tube which, under one test condition, flashes if the interval of time which is being measured is not too short and which, under another test condition, fails to flash if the interval of time which is being measured is not too long.

A feature of the invention is a timing device, adapted to test the interval during which electrical contacts are closed, comprising a condenser connected across the anode and cathode of a gas-filled tube which under one test condition flashes if the interval being tested is not too short and which under another test condition fails to flash if the interval being tested is not too long.

Another feature of the invention is a timing device comprising a condenser connected across the anode and cathode of a gas-filled tube to measure the interval during which an electrical switch is in either of its alternative positions. In either case the tube flashes if the interval being measured is not too short and fails to flash if the interval being measured is not too long. As applied to an impulse receiving relay, the timing device is arranged to test the length of the interval during which the armature of the relay engages its back contact or to test the length of the interval during which the armature engages its front contact.

A further feature of the invention is a timing device comprising a condenser connected to a gas-filled tube, a circuit for charging the condenser to a potential sufficient to cause breakdown of the tube, the charging circuit being effective during the interval of time which is being measured, and a key for controlling the time required to charge the condenser to the breakdown potential. The operation of the key may be effective to decrease the resistance in the charging circuit and thereby decrease the time required for charging the condenser to the potential required for breakdown of the tube. Alternatively the operation of the key may be effective to increase the electrical capacitance connected to the tube so as to increase the time required for charging the condenser to the potential required for breakdown of the tube.

These and other features of the invention are further described in their application to the three timing devices shown schematically in the drawing which forms a part of this specification. The invention is not limited in its application to the devices shown in the drawing but is applicable to other electrical timing devices. Referring to the drawing:

Fig. 1 shows a source of current impulses I connected to a testing device TD, comprising the condenser 14, gas-filled tube 22, and keys 24 and 27, adapted to check the interval during which electrical contacts are open;

Figure 1:
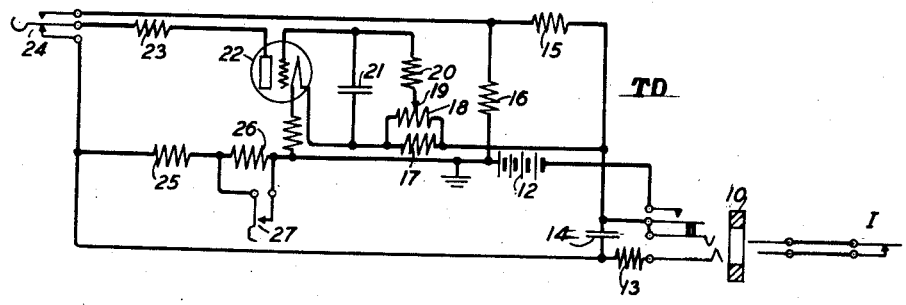

The impulse source I may be a dial such as is used in automatic telephone systems, a repeater which is adapted to transmit open-circuit impulses of desired duration, or any contact or contacts adapted to open and close an electrical circuit. A jack 10 enables connection of the testing device TD with any impulse source, the operation of which is to be tested. Upon insertion of a plug in jack 10, the battery 12 is connected to render the testing device operative, the filament of tube 22 being energized in a circuit which includes resistors 17 and 18 in parallel. With key 24 normal, condenser 14 is connected, in series with resistor 23 and resistors 17 and 18, across the anode and filament of tube 22 so that the electromotive force impressed across the anode and filament depends on the difference in potential between the terminals of condenser 14. Resistor 18 and contact 19 constitute a potentiometer for adjusting the grid bias of tube 22, the electromotive force necessary to start current between the anode and filament being dependent on the difference in potential between the grid and filament. For a more complete description of the operating characteristics of a three-element gas-filled tube, reference may be had to an article entitled "Hot-Cathode Thyratrons" by A. W. Hull published in General Electric Review, vol. 33, pages 213 to 223 inclusive.

Upon connection of an impulse source I with jack 10 of the impulse testing device TD, an impulse circuit is traced from battery 12 through the upper contact and tip conductor of jack 10, through the impulse contacts of impulse source I, ring conductor of jack 10, resistor 13, and through resistors 25 and 26 to ground. Condenser 14, being connected in series with resistor 13 across the tip and ring conductors of jack 10 is only partially charged while the impulse circuit is closed; and, due to the drop in potential through resistors 25 and 26, the potential thus impressed across the anode and cathode of the gas-filled tube 22 is not sufficient to cause breakdown of the tube. To establish the desired ratio between the voltage of battery 12 and the potential on condenser 14 at which the tube 22 will break down and thereby render the time required for charging condenser 14 to cause breakdown of the tube, independent of the voltage of battery 12 or the characteristics of the particular tube which is used, potentiometer contact 19 is adjusted so that the tube 22 barely flashes when key 24 is temporarily operated. With key 24 operated, the difference in potential between the anode and filament is dependent on the drop in potential through resistor 15 which in turn bears a constant ratio to the potential of battery 12 since it is one leg of the potentiometer formed by resistors 15 and 16.

After adjustment of the potentiometer contact 19 as above described, and with keys 24 and 27 in normal position, the impulse source I may be operated to transmit an impulse, the open period of which is to be checked to determine whether it falls within desired limits. As soon as the impulse contacts open, the condenser 14 starts to charge, the rate of charge being controlled by resistors 25 and 26 so that a definite interval of time is required before the difference in potential across the terminals of condenser 14 is sufficient to cause breakdown of tube 22. If the impulse circuit should be again closed and end the impulse before condenser 14 is charged sufficiently to break down the tube, the tube does not flash and the condenser discharges through the impulse contacts, the failure of the tube to flash indicating that the open period of the impulse is not too long. If, however, the open period endures long enough to charge condenser 14 to the breakdown point, tube 22 flashes indicating that the open period is too long.

After determining whether the open period is too long, key 27 is operated thereby short-circuiting resistor 26. Operation of the impulse source I now causes the charging of condenser 14 at a faster rate than was the case with key 27 normal. The time required for condenser 14 to be charged sufficiently to cause breakdown of tube 22 is therefore decreased; and, if the open period is not too short, the tube 22 should flash before the impulse is terminated by the closing of the impulse contacts. If a series of impulses are transmitted, the tube 22 should flash in response to each impulse. But, if the open period is shorter than the time required to charge condenser 14 to the breakdown point, tube 22 fails to flash, thereby indicating that the impulse is too short.

The condenser 14 may be a single condenser unit or a plurality of condenser units connected in parallel. The resistor 13, which has a low resistance compared to that of resistor 25, prevents too large a current through the contacts of the impulse source I when these contacts close after condenser 14 has been charged. The resistor 23 limits the anode-cathode current to prevent injury to the tube after breakdown. The condenser 21, which is mounted immediately adjacent tube 22, has a small capacity; it is connected between the grid and filament to prevent false operation of the tube due to electromotive forces induced in the wires connected to the grid. The resistor 20 limits the grid current while there is a current between the anode and cathode. Before connecting the impulse source to be checked to the testing device TD, all condensers and other conductors having capacitance should be disconnected from the impulse source to prevent interference with charging of condenser 14.

Figure 2:
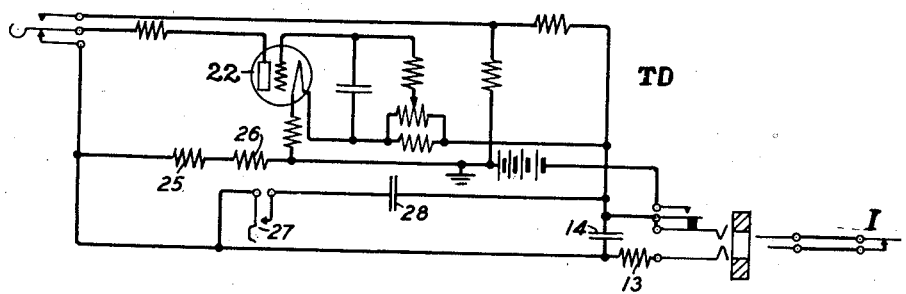
Fig. 2 shows a modification of the testing device shown in Fig. 1.

The alternative arrangement shown in Fig. 2 is the same as that shown in Fig. 1 except that key 27 is arranged to connect an additional condenser 28 in parallel with condenser 14 instead of short-circuiting the resistor 26. The capacity to be charged, during the open period of an impulse cycle, is therefore increased so that flashing of the tube 22 with key 27 in operated position indicates completion of a longer interval than does the flashing of the tube with key 27 in normal position. The resistors and condensers are so chosen that with key 27 normal the tube will flash if the open period is not too short and with key 27 operated the tube will fail to flash if the open period is not too long.

Figure 3:
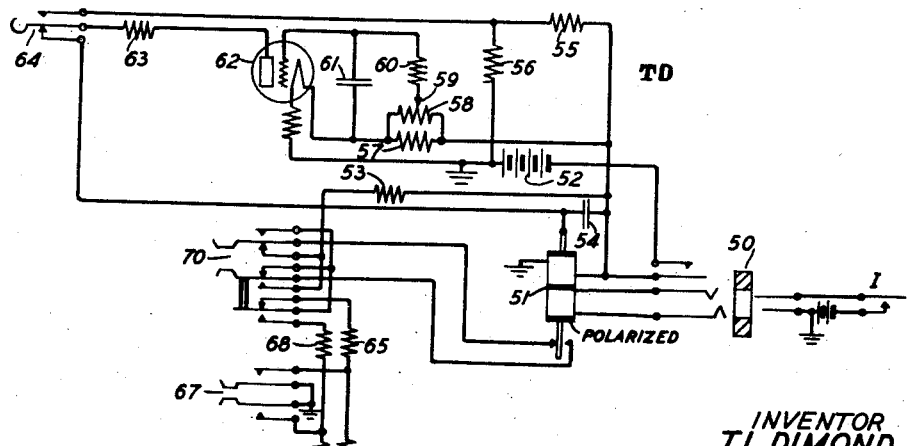
Fig. 3 shows a testing device TD, comprising the condenser 54 and gas-filled tube 62, adapted to check the interval during which electrical contacts are closed.

The testing device TD shown in Fig. 3 includes a polarized impulse receiving relay 51 which responds to impulses from a source I to which the testing device is connected by means of jack 50. Upon insertion of a plug in jack 50, the battery 52 is connected to energize the filament of the three-element gas-filled tube 62 and to energize the biasing winding of relay 51. The timing condenser 54 is connected across the anode and cathode of tube 62 so as to test the interval during which the front contact of relay 51 is closed, in which case key 70 is normal, or to test the interval during which the back contact of relay 51 is closed, in which case key 70 is operated. The testing operation is similar to that of the circuit arrangement shown in Fig. 1. The grid bias is potentiometer controlled, the required setting of contact 59 being such that the tube 62 barely flashes when key 64 is temporarily operated. With keys 67 and 70 normal and with relay 51 normal, resistor 53 is connected across condenser 54 so that the condenser is discharged. When relay 51 operates, upon the closure of the contacts of the impulse source I, the discharge path through resistor 53 is opened, and condenser 54 begins to charge in a circuit traced from battery 52, through the upper contact of jack 50, condenser 54, front contact of relay 51, lower back contacts of key 70, through resistors 65 and 66 to ground. If the front contacts of relay 51 open before condenser 54 is charged to a potential difference sufficient to break down tube 62, the condenser 54 discharges through the back contact of relay 51 and resistor 53; and failure of the tube to flash indicates that the closure of the front contact of relay 51 is not too long. If, however, the closure of this contact endures long enough to charge condenser 54 to the breakdown potential, tube 62 flashes indicating that the closure is too long.

To determine whether the closure of the front contact of relay 51 is not too short, key 67 is operated thereby short-circuiting resistor 66 to decrease the length of time required to charge condenser 54 to a potential sufficient to break down tube 62. If the closure of the front contact of relay 51 is not too short, tube 62 flashes; but if the closure of these contacts is less than the allowable minimum, condenser 54 is not charged sufficiently to break down tube 62.

To test the closure of the back contact of relay 51, key 70 is operated, thereby including resistors 68 and 69 in the circuit for charging condenser 54 in place of resistors 65 and 66. When the front contact of relay 51 is closed, condenser 54 is discharged through resistor 53; and when the back contact of relay 51 closes, condenser 54 starts to charge in series with resistors 68 and 69. If the closure is not too long, the tube 62 fails to flash and if the closure is too long the tube flashes. Then with key 67 operated, resistor 69 is short-circuited, so that if the closure of the back contact of relay 51 is not too short tube 62 flashes but if this closure is too short the tube fails to flash.

What is claimed is:

1. A timing device for measuring the length of an interval of time, said device comprising a three-element hot-cathode gas-filled tube, a condenser connected across the anode and cathode of said tube, a circuit for charging said condenser to a potential sufficient to start current between the anode and cathode, and means for rendering said charging circuit effective at the beginning of an interval of time, the length of which is being measured, and for discharging said condenser at the end of said interval.

2. A timing device comprising a three-element gas-filled tube, a condenser connected across the anode and cathode of said tube, a circuit for charging said condenser to a potential high enough to start current between the anode and cathode of the tube, means for rendering said charging circuit effective at the beginning of an interval of time, and for discharging said condenser at the end of said interval, and means including the grid of the tube for varying the time required for said condenser to be charged to a potential sufficient to start current between the anode and cathode of the tube.

3. A timing device comprising a three-element gas-filled tube, a condenser connected across the anode and cathode of said tube, a circuit for charging said condenser to a potential high enough to start current between the anode and cathode of the tube, means for rendering the charging circuit effective at the beginning of an interval of time, the length of which is being measured, and for discharging said condenser at the end of said interval, means for biasing the grid of said tube to control the potential difference at which current will be started between the anode and cathode, and key controlled means for varying the time required to charge said condenser to a potential sufficient to start current between the anode and cathode of the tube.

4. A timing device comprising a three-element gas-filled tube, a condenser connected across the anode and cathode of said tube, a circuit for charging said condenser to a potential high enough to start current between the anode and cathode of the tube, means for rendering the charging circuit effective at the beginning of an interval of time, the length of which is being measured, and for discharging said condenser at the end of said interval, adjustable means for biasing the grid of said tube to control the potential difference at which current will be started between the anode and cathode, and key controlled means for varying the time required to charge said condenser to a potential sufficient to start current between the anode and cathode of the tube.

5. A timing device comprising a three-element gas-filled tube, a condenser connected across the anode and cathode of said tube, a circuit for charging said condenser to a potential high enough to start current between the anode and cathode of the tube, means for rendering the charging circuit effective at the beginning of an interval of time, the length of which is being measured, and for discharging said condenser at the end of said interval, adjustable means for biasing the grid of said tube to control the potential difference at which current will be started between the anode and cathode, a resistor included in said charging circuit, and a key for short-circuiting said resistor.

6. A timing device comprising a three-element gas-filled tube, a condenser connected across the anode and cathode of said tube, a circuit for charging said condenser to a potential high enough to start current between the anode and cathode of the tube, means for rendering the charging circuit effective at the beginning of an interval of time, the length of which is being measured, and for discharging said condenser at the end of said interval, adjustable means for biasing the grid of said tube to control the potential difference at which current will be started between the anode and cathode, and manually controlled means for increasing the length of time required to charge said condenser to a potential sufficient to start current between the anode and cathode.

7. A timing device comprising a three-element gas-filled tube, a condenser connected across the anode and cathode of said tube, a circuit for charging said condenser to a potential high enough to start current between the anode and cathode of the tube, means for rendering the charging circuit effective at the beginning of an interval of time, the length of which is being measured, and for discharging said condenser at the end of said interval, adjustable means for biasing the grid of said tube to control the potential difference at which current will be started between the anode and cathode, another condenser, and a key for connecting said other condenser in parallel with the first mentioned condenser to increase the interval required for impressing the breakdown potential across the anode and cathode of the tube.

8. A timing device comprising a three-element gas-filled tube, a source of energy for energizing the filament of said tube, a condenser connected across the anode and filament of said tube, a circuit for charging said condenser to a potential sufficient to start current between the anode and filament, means for rendering the charging circuit effective at the beginning of an interval of time, the length of which is being measured, and for discharging said condenser at the end of said interval, means for biasing the grid of said tube to control the potential at which breakdown of the tube occurs, and means for varying the time required for impressing the breakdown potential across the anode and filament of the tube.

9. In a signaling system, a first circuit, contacts for creating impulses in said first circuit, and means for testing the duration of an impulse created by the operation of said contacts, said means comprising a three-element gas-filled tube, a condenser connected across the anode and cathode of said tube, a circuit for charging said condenser to a potential sufficient to cause breakdown of the tube, said charging circuit becoming effective at the beginning of an impulse in said first circuit, and means for varying the length of time required to charge said condenser sufficiently to cause breakdown of the tube.

10. In a signaling system, a first circuit, contacts for creating impulses in said first circuit, and means for testing the duration of an impulse created by the operation of said contacts, said means comprising a three-element gas-filled tube, a condenser connected across the anode and cathode of said tube, a circuit for charging said condenser to a potential sufficient to cause breakdown of the tube, said charging circuit becoming effective at the beginning of an impulse in said first circuit, means for biasing the grid of the tube to fix the difference in potential between the anode and cathode at which breakdown of the tube occurs, and means for varying the rate at which said condenser is charged.

11. In a signaling system, a first circuit, contacts for creating impulses in said first circuit, and means for testing the duration of an impulse created by the operation of said contacts, said means comprising a three-element gas-filled tube, a condenser connected across the anode and cathode of said tube, a circuit for charging said condenser to a potential sufficient to cause breakdown of the tube, said charging circuit becoming effective at the beginning of an impulse in said first circuit, means for biasing the grid of the tube to fix the difference in potential between the anode and cathode at which breakdown of the tube occurs, and means for increasing the capacitance connected across the anode and filament.

12. A testing device for determining whether an interval of time falls within desired limits, said device comprising a three-element gas-filled tube, a condenser connected across the anode and cathode of said tube, a circuit rendered effective at the beginning of the interval of time which is being tested for charging said condenser, a circuit for discharging said condenser if the interval ends before the tube flashes, the time required to charge said condenser to a potential sufficient to break down said tube being slightly longer than the longest allowable duration of the interval which is being tested so that failure of the tube to flash indicates that this interval is not too long, and means for decreasing the time, required to charge said condenser to the breakdown potential of the tube, to a value slightly less than the shortest allowable duration of the interval being tested so that the tube will flash if the interval is not too short.

13. A testing device for determining whether an interval of time falls within desired limits, said device comprising a gas-filled tube, a condenser connected across the anode and cathode of said tube, a circuit rendered effective at the beginning of the interval of time which is being tested for charging said condenser, a circuit for discharging said condenser if the interval ends before the tube flashes, the time required to charge said condenser to a potential sufficient to break down said tube being slightly longer than the longest allowable duration of the interval which is being tested so that failure of the tube to flash indicates that this interval is not too long, and a key effective to decrease the resistance in said charging circuit so that the time required to charge said condenser to the breakdown potential of the tube is slightly less than the shortest allowable duration of the interval being tested and the tube will flash only if the interval is not too short.

14. A testing device for determining whether an interval of time falls within desired limits, said device comprising a gas-filled tube, a condenser connected across the anode and cathode of said tube, a circuit rendered effective at the beginning of the interval of time which is being tested for charging said condenser, a circuit for discharging said condenser if the interval ends before the tube flashes, the time required to charge said condenser to a potential sufficient to break down said tube being slightly shorter than the shortest allowable duration of the interval which is being tested so that the tube will flash if the interval is not too short, another condenser, and a key for connecting said condenser in parallel, so that the time required to charge said condenser to a potential sufficient to break down the tube is slightly longer than the longest allowable duration of the interval being tested and failure of the tube to flash indicates that this interval is not too long.

15. In combination, normally closed circuit controlling contacts, normally open circuit controlling contacts, and a testing device for determining whether the interval said normally closed contacts are open falls within desired limits and for determining whether the interval said normally open contacts are closed falls within desired limits, said testing device comprising a gas-filled tube, a condenser connected across the anode and cathode of said tube, circuits for charging said condenser, a first one of said charging circuits being effective to start charging the condenser at the beginning of an interval during which said normally closed contacts are open and to charge said condenser to a potential sufficient to break down the tube before the interval ends in case the interval is longer than the allowable maximum, a second one of said charging circuits being effective to start charging the condenser at the beginning of an interval during which said normally closed contacts are open and to charge said condenser to a potential sufficient to break down the tube only if the interval is as long or longer than the allowable minimum, a third one of said charging circuits being effective to start charging the condenser at the beginning of an interval during which said normally open contacts are closed and to charge said condenser to a potential sufficient to break down the tube before the interval ends in case the interval is longer than the allowable maximum, and a fourth one of said circuits being effective to start charging the condenser at the beginning of an interval during which said normally open contacts are closed, and to charge said condenser to a potential sufficient to cause breakdown of the tube only if the interval is as long or longer than the allowable minimum.

16. In combination, normally closed circuit controlling contacts, normally open circuit controlling contacts, and a testing device for determining whether the interval said normally closed contacts are open falls within desired limits and for determining whether the interval said normally open contacts are closed falls within desired limits, said testing device comprising a gas-filled tube, a condenser connected across the anode and cathode of said tube, circuits for charging said condenser, a first one of said charging circuits being effective to start charging the condenser at the beginning of an interval during which said normally closed contacts are open, and to charge said condenser to a potential sufficient to break down the tube before the interval ends in case the interval is longer than the allowable maximum, a second one of said charging circuits being effective to start charging the condenser at the beginning of an interval during which said normally closed contacts are open and to charge said condenser to a potential sufficient to break down the tube only if the interval is as long or longer than the allowable minimum, a third one of said charging circuits being effective to start charging the condenser at the beginning of an interval during which said normally open contacts are closed and to charge said condenser to a potential sufficient to break down the tube before the interval ends in case the interval is longer than the allowable maximum, and a fourth one of said circuits being effective to start charging the condenser at the beginning of an interval during which said normally open contacts are closed and to charge said condenser to a potential sufficient to cause breakdown of the tube only if the interval is as long or longer than the allowable minimum, and manually operated means for preparing any one of said charging circuits for use.

17. In a signaling system, a signal receiving relay, having normally open and normally closed contacts, and a testing device for determining whether the intervals said normally closed contacts are open fall within desired limits and whether the intervals said normally open contacts are closed fall within desired limits, said testing device comprising a three-element gas-filled tube, a condenser connected across the anode and cathode of said tube, means including the grid of the tube for controlling the potential difference across said anode and cathode at which the tube breaks down, circuits for charging said condenser, a first one of said charging circuits being effective to start charging the condenser at the beginning of an interval during which said normally closed contacts are open and to charge said condenser to a potential sufficient to break down the tube before the interval ends in case the interval is longer than the allowable maximum, a second one of said charging circuits being effective to start charging the condenser at the beginning of an interval during which said normally closed contacts are open and to charge said condenser to a potential sufficient to break down the tube only if the interval is as long or longer than the allowable minimum, a third one of said charging circuits being effective to start charging the condenser at the beginning of an interval during which said normally open contacts are closed and to charge said condenser to a potential sufficient to break down the tube before the interval ends in case the interval is longer than the allowable maximum, and a fourth one of said circuits being effective to start charging the condenser at the beginning of an interval during which said normally open contacts are closed and to charge said condenser to a potential sufficient to cause breakdown of the tube only if the interval is as long or longer than the allowable minimum.

THOMAS L. DIMOND.